United States Patent
Santurbane

(10) Patent No.: US 9,446,817 B2
(45) Date of Patent: Sep. 20, 2016

(54) DERAILLEUR GUIDE DEVICE

(71) Applicant: SRAM Deutschland GmbH, Schweinfurt (DE)

(72) Inventor: Mark Santurbane, San Luis Obispo, CA (US)

(73) Assignee: SRAM Deutschland GmbH, Schweinfurt (DE)

( * ) Notice: Subject to any disclaimer, the term of this patent is extended or adjusted under 35 U.S.C. 154(b) by 292 days.

(21) Appl. No.: 13/654,109

(22) Filed: Oct. 17, 2012

(65) Prior Publication Data

US 2013/0095969 A1 Apr. 18, 2013

(30) Foreign Application Priority Data

Oct. 17, 2011 (DE) .................. 10 2011 116 047

(51) Int. Cl.
*B62M 9/136* (2010.01)
*F16B 37/12* (2006.01)
*B62J 13/00* (2006.01)
*B62M 9/00* (2006.01)

(52) U.S. Cl.
CPC ............. *B62M 9/136* (2013.01); *B62J 13/00* (2013.01); *F16B 37/125* (2013.01); *B62M 2009/007* (2013.01); *Y10T 29/49826* (2015.01)

(58) Field of Classification Search
CPC .... B62J 13/00; B62M 9/1342; B62M 9/1344; B62M 9/1346; B62M 9/9136; F16B 37/125
USPC ........... 474/140, 144, 80; 411/178, 357, 397, 411/427, 429, 80.1
See application file for complete search history.

(56) References Cited

U.S. PATENT DOCUMENTS

| | | | | | |
|---|---|---|---|---|---|
| 824,983 | A | * | 7/1906 | Farrington | 411/403 |
| 1,002,452 | A | * | 9/1911 | Rickards | 411/195 |
| 4,043,239 | A | * | 8/1977 | DeFusco | 411/337 |
| 4,237,743 | A | * | 12/1980 | Nagano | 474/82 |
| 4,311,421 | A | * | 1/1982 | Okada et al. | 411/59 |
| 4,610,587 | A | * | 9/1986 | Wollar et al. | 411/80.1 |
| 4,832,667 | A | * | 5/1989 | Wren | 474/140 |
| 4,960,402 | A | * | 10/1990 | Klein et al. | 474/80 |
| 5,002,520 | A | | 3/1991 | Greenlaw | |
| 5,460,576 | A | * | 10/1995 | Barnett | 474/144 |
| 5,964,767 | A | * | 10/1999 | Tapia et al. | 606/323 |
| 6,045,126 | A | * | 4/2000 | Brzezinski | 269/282 |
| 6,776,566 | B2 | * | 8/2004 | Kobusch et al. | 411/546 |
| 7,585,237 | B2 | * | 9/2009 | Fukuda | 474/80 |
| D635,062 | S | | 3/2011 | Savola et al. | |
| 8,206,071 | B1 | * | 6/2012 | Johnson | 411/383 |
| 2005/0143206 | A1 | * | 6/2005 | Tetsuka et al. | 474/80 |
| 2005/0273105 | A1 | * | 12/2005 | Konieczynski et al. | 606/69 |

(Continued)

FOREIGN PATENT DOCUMENTS

EP 1867563 12/2007

*Primary Examiner* — Minh Truong
(74) *Attorney, Agent, or Firm* — Milan Milosevic; Lisa Serdynski

(57) ABSTRACT

The invention relates to a chain catcher used on multiple chainring arrangements on bicycles in combination with a derailleur to prevent the drive chain from slipping off the smallest chainring into the space between the chainring and the bicycle frame. The embodiment of a chain catcher according to the invention permits especially simple mounting and adjustment by using an additional fastening element. The corresponding method includes completion of the positioning, fastening, and adjustment of the derailleur before the chain catcher is installed.

17 Claims, 8 Drawing Sheets

(56) References Cited

U.S. PATENT DOCUMENTS

| | | | |
|---|---|---|---|
| 2007/0117666 A1* | 5/2007 | Ichida et al. | 474/80 |
| 2007/0293359 A1* | 12/2007 | Yamamoto et al. | 474/80 |
| 2010/0247270 A1* | 9/2010 | Cao | 411/432 |
| 2011/0230287 A1 | 9/2011 | Savola | |
| 2012/0172164 A1* | 7/2012 | Vogt | 474/140 |

* cited by examiner

DERAILLEUR GUIDE DEVICE

BACKGROUND OF THE INVENTION

Modern bicycles usually have several sprocket wheels, also known as chainrings, attached to or mounted on the pedal crank mechanism. A front derailleur serves to change the drive chain from its engagement with one chainring to engagement with an adjacent chainring. To do so, it has a chain guide which is moved in a direction across the plane of the chainring by means of a parallelogram mechanism and acts directly on the chain.

The essentially good function of a guide for the drive chain due to the chain guide cannot, however, with absolute certainty prevent the drive chain from becoming disengaged and slipping laterally on the inside of the smaller of the chainrings and entering the space between the chainrings and the bicycle frame when switching from engagement on the larger chainring to engagement on the next smaller chainring. For the cyclist, there is no possible way to return the chain back to one of the chainrings, which is a severe disadvantage, in particular, in a racing situation.

For this reason, additional chain guide devices, also known as "chain catchers," have been introduced; they are installed directly or indirectly on the bicycle frame in addition to the derailleur. One embodiment of such a device is disclosed in U.S. Patent Application No. 2011/0230287. The chain catcher used there is an elongated part with multiple bends, which is clamped securely with the same screw used for fastening the derailleur on the derailleur holding part. One disadvantage of such a device is the need to perform the adjustment of both components simultaneously when the derailleur and the chain catcher are installed. The derailleur must be aligned in height and also in the angular orientation in relation to the seat tube of the bicycle frame and optimized with respect to its ability to effect chain shifting between two or more chainrings. The chain catcher must be positioned in its lateral position in relation to the smallest chainring without disturbing the optimal position of the derailleur, which is possible only with great difficulty.

There is a need therefore, for a chain catcher that is simple to install and adjust. The invention satisfies the need.

BRIEF SUMMARY OF THE INVENTION

An object of the chain catcher according to the present invention is therefore to simplify installation and adjustments. According to an embodiment of the invention, additional mounting means are provided for mounting the chain catcher for this purpose. This yields the possibility of performing the installation and orientation of the chain catcher and the derailleur independently of one another and in succession.

BRIEF DESCRIPTION OF THE SEVERAL VIEWS OF THE DRAWINGS

The invention is explained by way of example below based on the attached figures.

DETAILED DESCRIPTION OF THE INVENTION

Figure 1:
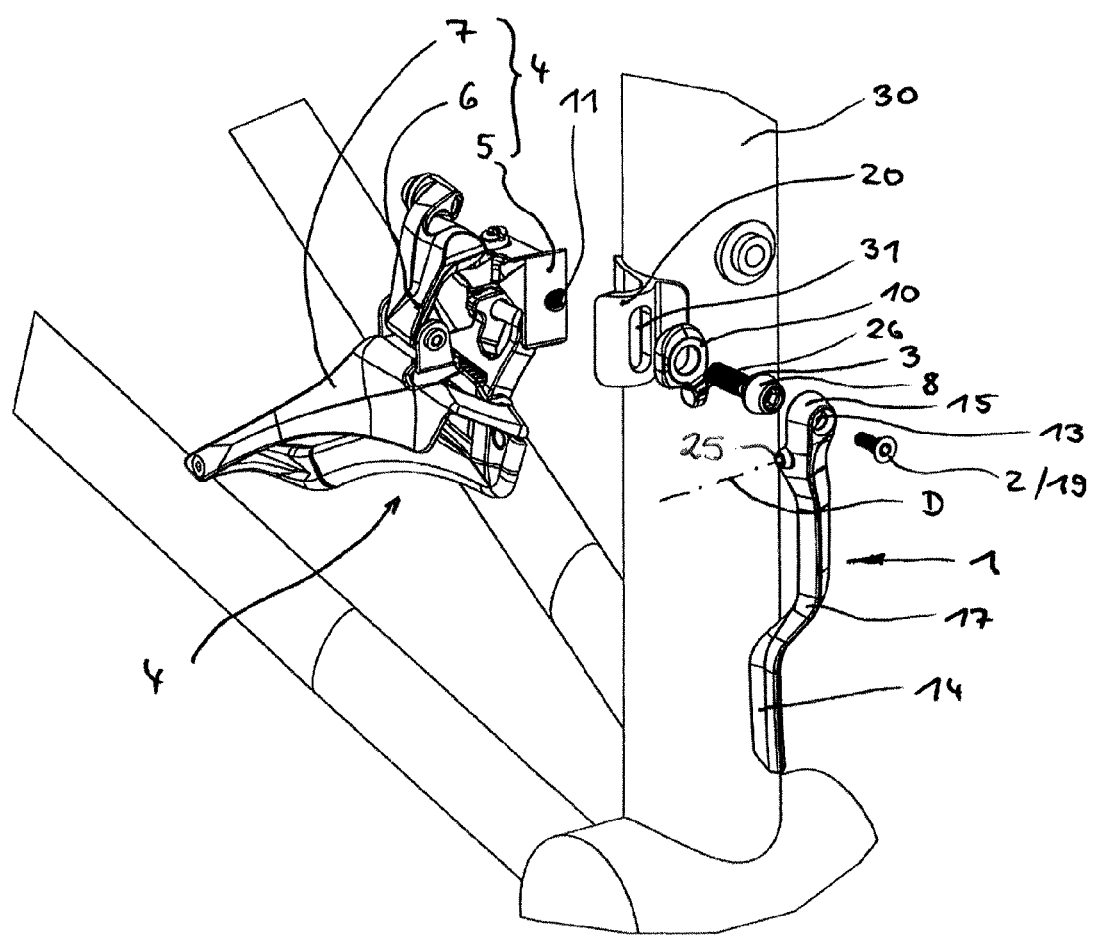
FIG. 1 is a preferred embodiment of the chain catcher according to the invention for installation on a derailleur holding part which is connected to the seat tube of the bicycle frame.

FIG. 1 shows the chain catcher 1, which is installed with an additional chain guide or chain catcher mounting element 2 in the form of a mounting screw 19 on the front derailleur in relation to the bicycle frame 30 and consequently also in relation to chainrings on the pedal crank mechanism (not shown). The main components of the derailleur 4 include a base part 5, a parallelogram mechanism 6 and a chain guide 7. The base part 5 is fastened to the derailleur holding part 20 on the bicycle frame 30 with a front derailleur mounting element, in this embodiment, a fastening screw 3 which is screwed into an inside fastening thread 11 in the base part. The derailleur holding part 20 is fixedly connected to the bicycle frame 30 by clamping, soldering, welding, gluing or riveting or by means of some other type of fastening.

The chain catcher 1 has a guide section 14, a connecting section 17 and a mounting section 15 on the end opposite the guide section 14, said end having a mounting opening 13 as well as a circumferential surface 16 on the internal circumference of the mounting opening 13. A mounting screw 19 is arranged in the mounting opening 13 and brings the circumferential surface 16 in the mounting section 15 into frictionally locking contact with the contact surface 12 on the fastening screw head 8 of the fastening screw 3. The circumferential surface 16 and the contact surface 12 may have a conical shape. Due to the resulting wedge effect, relatively minor forces of the mounting screw 19 in the direction of the axis A, the central axis of the contact surface 12, are sufficient to secure the chain catcher 1 reliably in its angular position about the axis A (see FIG. 2). The inside mounting thread 22 for screwing in the mounting screw 19 is arranged concentrically in the fastening screw 3 along the axis A.

Figure 2:
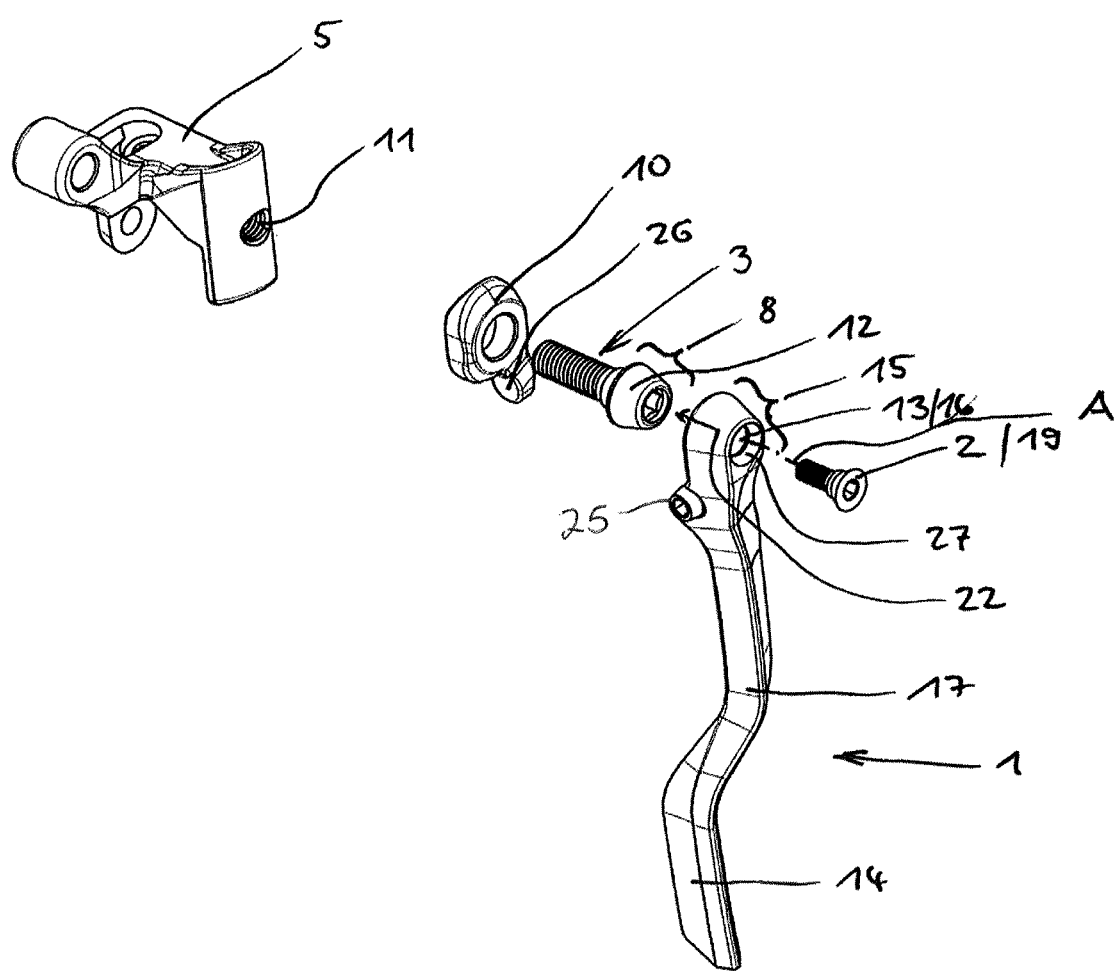
FIG. 2 is an embodiment of the chain catcher according to the invention as shown in FIG. 1 in a detailed view.
Figure 6:
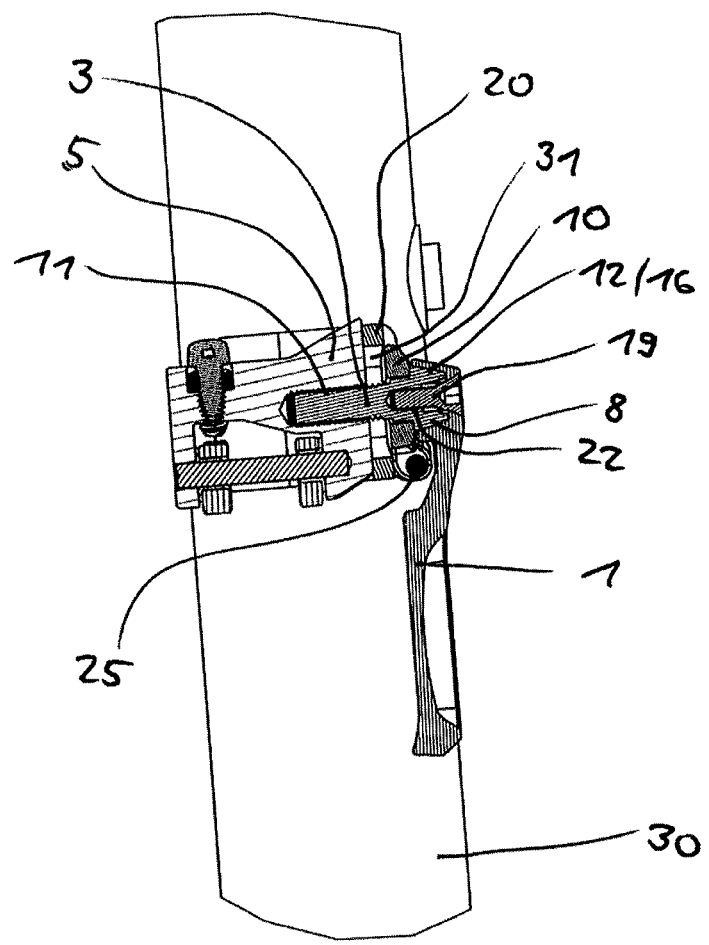
FIG. 6 is a sectional view of the embodiment according to FIG. 1 parallel to the seat tube.

The individual parts for fastening the derailleur and for installing the chain catcher 1 according to FIG. 1 are also shown in detail in an exploded diagram in FIG. 2 and in a sectional diagram in FIG. 6. For fastening the derailleur 4 on the derailleur holding part 20, the fastening screw 3 is inserted into an elongated hole 31 in the derailleur holding part 20 and is screwed into an inside fastening thread 11 in the base part 5. The derailleur 4 can be offset in the direction of the longitudinal extent of the elongated hole 31 with respect to the bicycle frame 30 and thus also with respect to the chainrings.

The fastening screw 3 has a fastening screw head 8 with a contact surface 12 on the outer circumference, a hexagon socket shape for engaging a hex-head wrench and, in axial continuation of the hexagon socket shape, an inside mounting thread 22 for screwing into the outside thread on the mounting screw 19. The derailleur holding part 20 is clamped between the base part 5 and the fastening screw head 8 of the fastening screw 3, wherein an additional retaining plate 10 is used. Due to the design of the engaged surfaces on the base part 5, on the derailleur holding part 20 and on the retaining part 10 in the form of a cylindrical surface, it is possible to rotate the derailleur in relation to the bicycle frame 30. The axis of rotation is aligned essentially in parallel to the seat tube of the bicycle frame 30.

With the help of an adjusting screw 25, which is aligned in the direction D in a plane perpendicular to the axis A, a precision adjustment of the angular position of the chain catcher is possible. To do so, the adjusting screw 25 is steadied on the stop 26, which may be designed or formed in one piece with the retaining plate 10, with respect to the derailleur holding part 20. The chain catcher 1 can be pivoted easily about the axis A because the contact surface 12 on the fastening screw head 8 and also the mounting screw 19 are arranged concentrically about the axis A.

Figure 3:
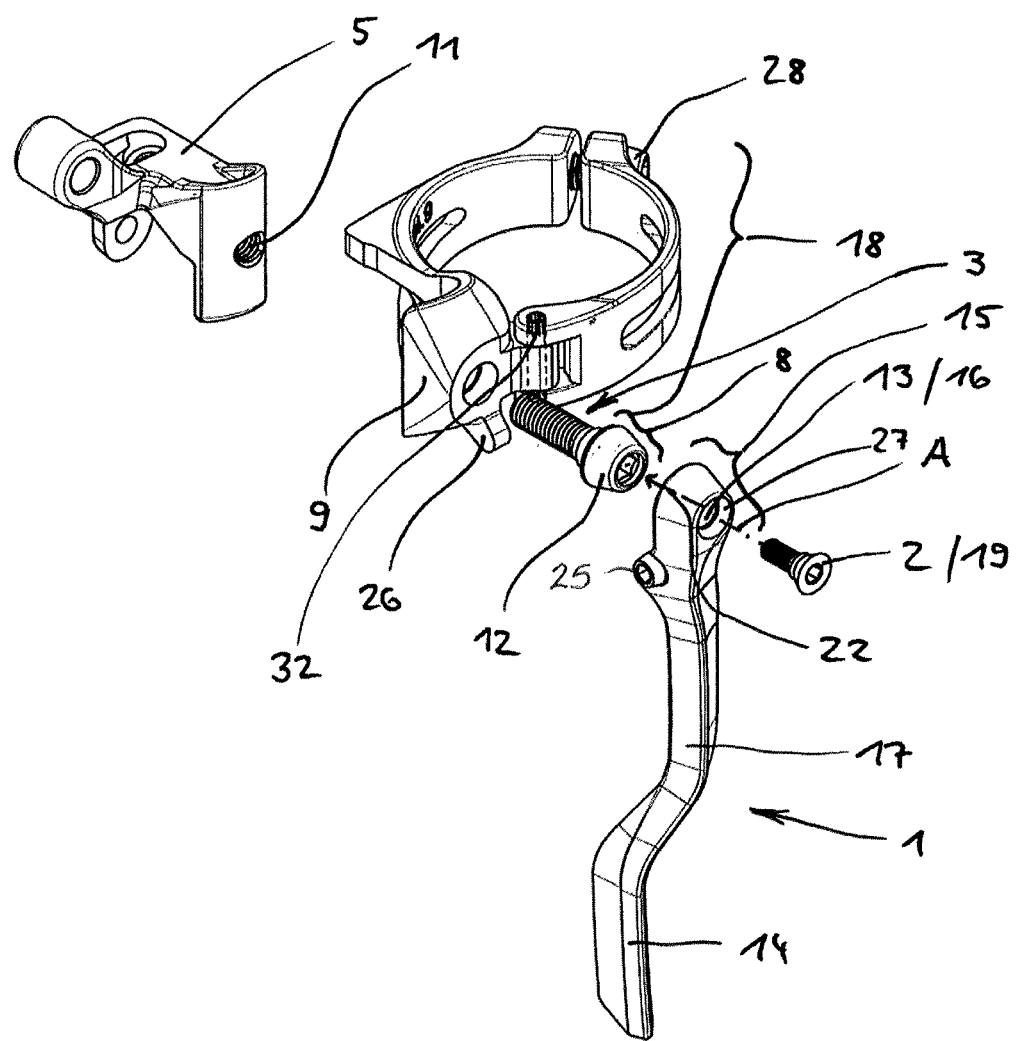
FIG. 3 is a chain catcher according to the invention in a second embodiment for installation on a derailleur with a mounting clamp in a detailed view.

The derailleur shown in FIG. 3 is designed with an additional clamp 18 with a derailleur mounting base 9. The clamp 18 has an opening through which the seat tube of the bicycle frame 30 extends. For mounting the clamp 18 on the seat tube, the clamp 18 can be opened and closed again by pivoting it on a hinge 32. The clamp 18 is secured on the bicycle frame 30 by means of a clamping screw 28. The derailleur 4 can be oriented with respect to the bicycle frame 30 and thus with respect to the chainrings by turning the clamp 18 and by displacement vertically along the seat tube. Thus there is no need for adjustment options between the base part 5 and the derailleur mounting base 9.

The derailleur mounting base 9 is provided with a borehole through which the fastening screw 3 is inserted. The outside thread on the fastening screw 3 is screwed into an inside fastening thread 11 in the base part 5. The derailleur includes, in addition to the base part 5, a parallelogram mechanism 6 and a chain guide 7. Neither of these two parts is shown in FIG. 3.

The design of the chain catcher 1, the mounting screw 19, the fastening screw 3 and the adjusting screw 25 corresponds to the embodiment according to FIG. 1.

Figure 5:
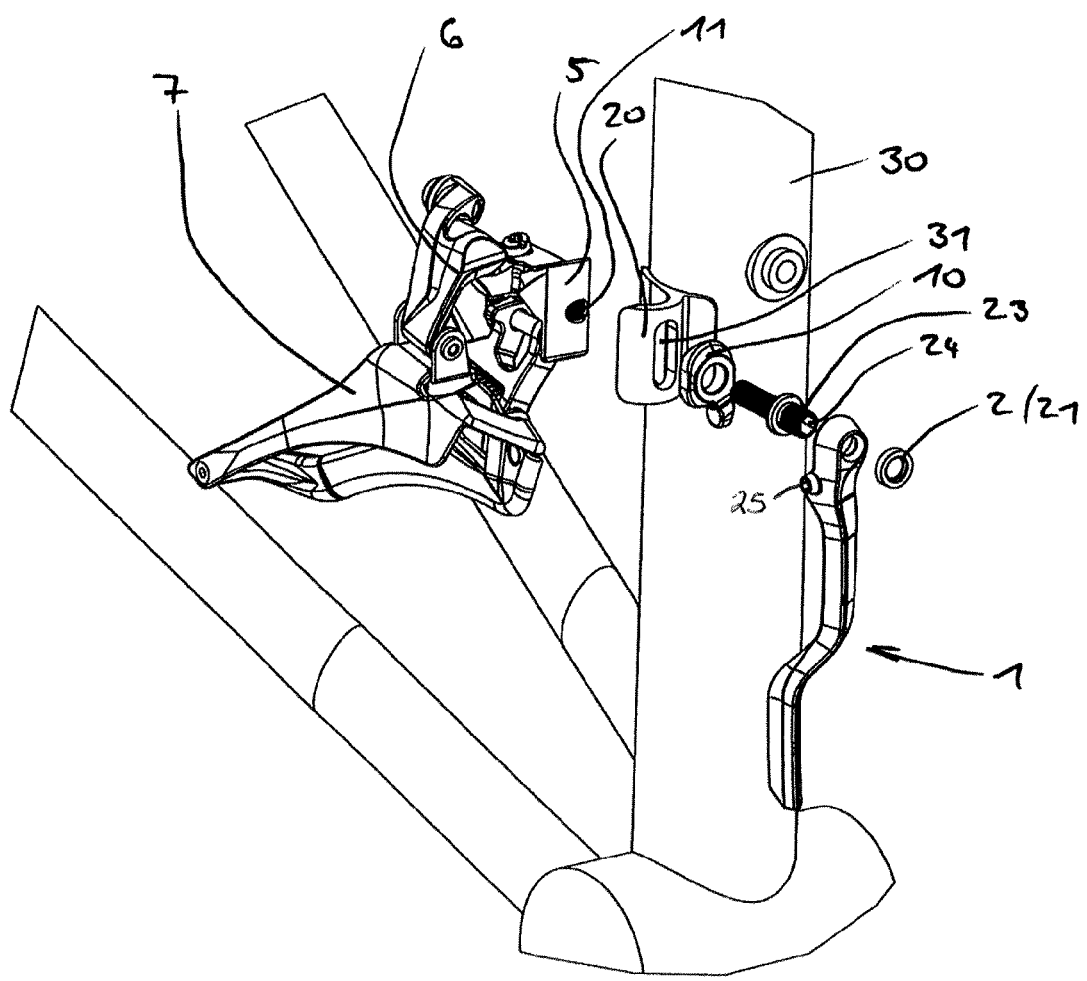
FIG. 5 is a chain catcher according to the invention in a fourth embodiment.
Figure 8:
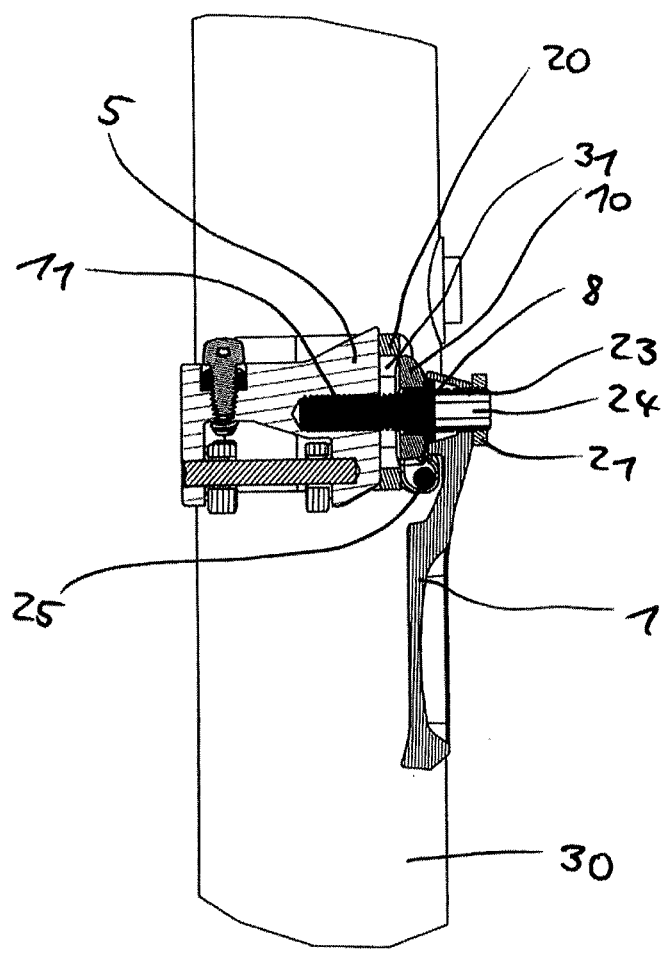
FIG. 8 is a sectional view of the embodiment according to FIG. 5 parallel to the seat tube.

Still more embodiments of the chain catcher are obtained by replacing the mounting screw 19 with a mounting nut 21, which is shown in FIGS. 5 and 8. For mounting the chain catcher 1 on the derailleur 4, the mounting nut 21 is screwed onto an outside mounting thread 23 on the mounting bolt 24.

Figure 4:
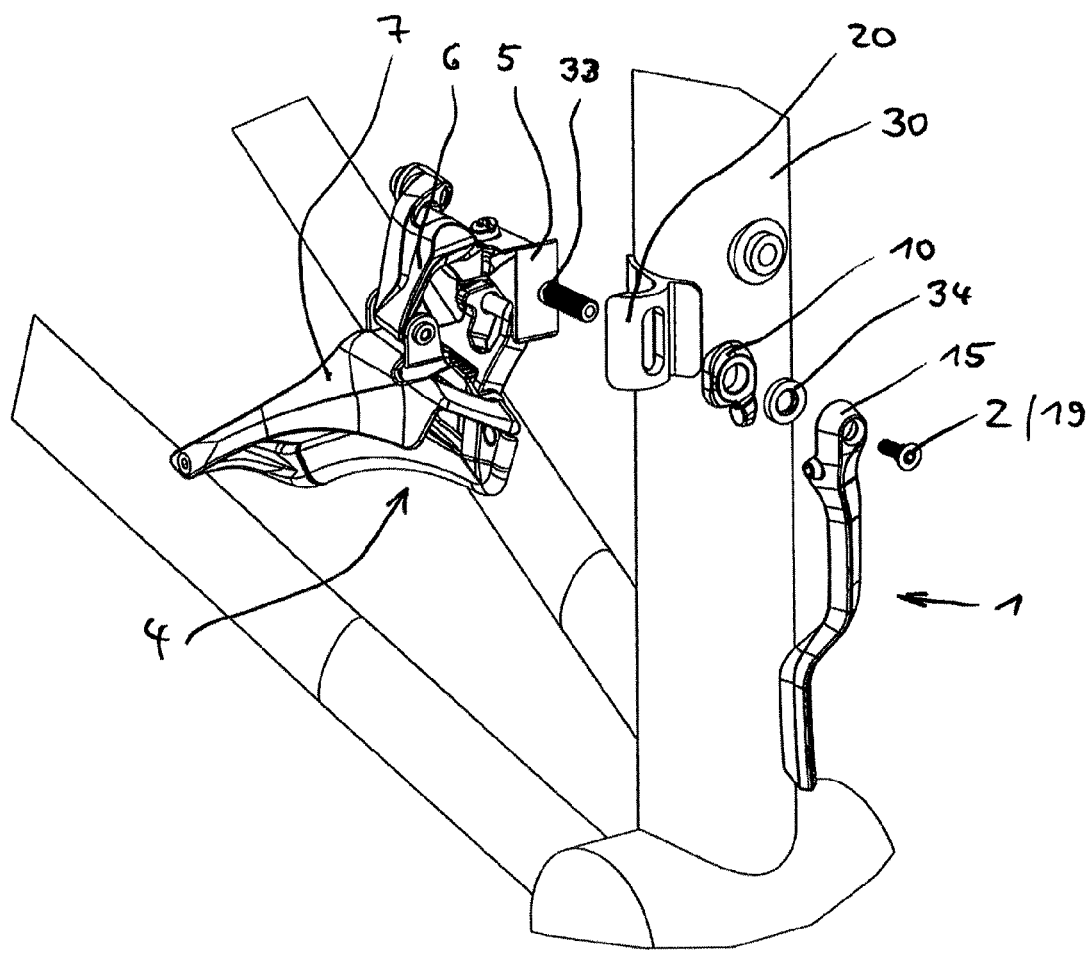
FIG. 4 is a chain catcher according to the invention in a third embodiment.
Figure 7:
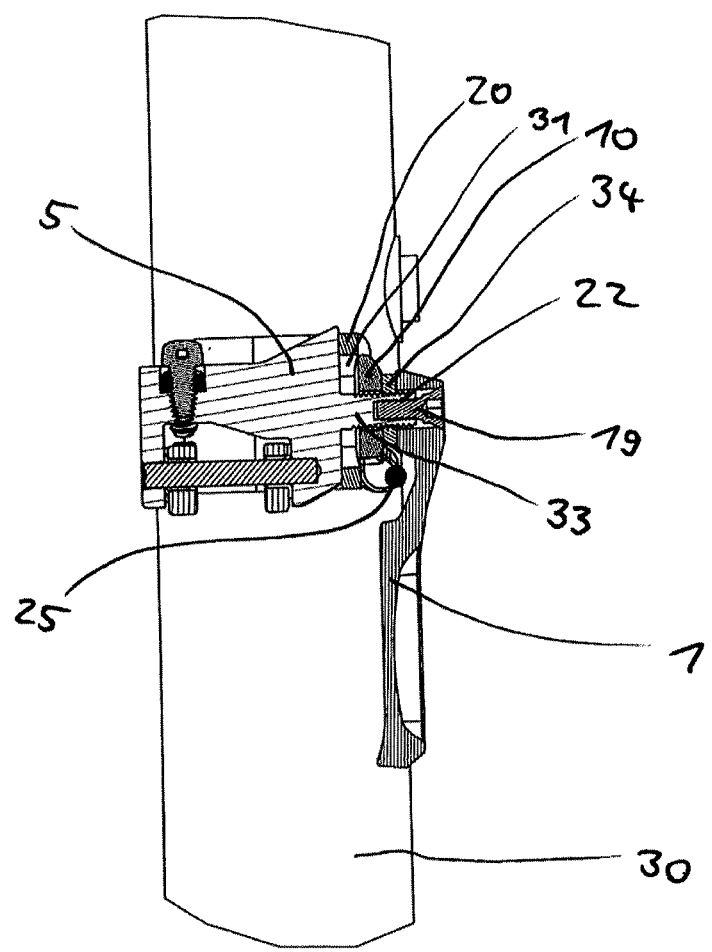
FIG. 7 is a sectional view of the embodiment according to FIG. 4 parallel to the seat tube.

The derailleur according to FIGS. 4 and 7 has a fastening bolt 33 with an outside thread on the base part 5. A fastening nut 34 is screwed onto this outside thread for fastening the derailleur 4 to the derailleur holding part 20. The fastening nut has elements (like faces, not shown) on the outside circumference for engaging with a tool. The fastening bolt 33 is pressed into the base part 5 or glued or otherwise connected to the base part 5 or designed in one piece with the base part 5, or the fastening bolt 33 is passed through a through-bore in the base part 5 and has a head on the end which is in the base part 5. The retaining plate 10 and the mounting screw 19 are designed as in the embodiment according to FIG. 1. The chain catcher 1 has a modified mounting section 15 in relation to the embodiment in FIG. 1, to have surface contact with the fastening nut 34.

Additional embodiments of chain catchers 1 according to the invention are obtained when, as shown in FIG. 2, means for mounting the chain catcher 1 are provided in addition to the retaining plate 10 according to FIG. 2, again starting from an inside mounting thread in the retaining plate 10 or from an outside mounting thread on an additional bolt-shaped part on the retaining plate 10.

In another possible embodiment of a derailleur (not shown in the figures) with which the chain catcher 1 according to the invention is used, base part 5 and the derailleur mounting base 9 are designed in one piece on the clamp 18 according to FIG. 3, wherein the clamp 18 is retained and the fastening screw 3 is omitted. In this type of derailleur, there is an additional mounting thread 22 in the base part 5, or an additional bolt protrudes in the manner of the fastening bolt 33 on the base part 5, as also shown in FIG. 7 with an embodiment of a derailleur without the clamp. A thread is again provided on this bolt for mounting the chain catcher 1 on the derailleur 4 by means of a chain guide mounting element 2.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A chain guide arrangement for guiding a drive chain on a set of front chainrings on a bicycle with a bicycle frame, with a chain guide member which is designed for installation on a base part of a front derailleur mounted on the bicycle frame, the front derailleur including a front derailleur mounting element the chain guide member comprising:
   a mounting section including a mounting opening;
   a guide section which is arranged with an offset from the mounting section, the guide section being positionable adjacent the drive chain;
   a connecting section between the mounting section and the guide section;
   a chain guide mounting element configured to be mounted along a mounting axis to the front derailleur mounting element to fasten the mounting section of the chain guide member to the base part of the front derailleur independently of the mounting of the front derailleur to the bicycle frame; and
   an angular positioning device configured to set an angular position of the chain guide member about the mounting axis of the chain guide member,
   wherein the front derailleur mounting element includes a fastening screw threadably connectable to the base part of the front derailleur to mount the front derailleur to the bicycle frame, and the angular positioning device comprises an adjusting screw disposed in the mounting section of the chain guide member and a retaining plate disposed between a fastening screw head of the fastening screw and the base part, the adjusting screw positioned along an axis (D) generally perpendicular to an axis (A) of the fastening screw, wherein the adjusting screw bears against a stop formed on the retaining plate to allow an adjustment of the chain guide member in an angular position about the axis (A).

2. The chain guide arrangement for guiding a drive chain according to claim 1, further comprising a clamp formed integral with the base part of the front derailleur, wherein the base part has an inside mounting thread or an outside mounting thread for mounting the chain guide member.

3. The chain guide arrangement for guiding a drive chain according to claim 1, wherein the retaining plate is configured to be clamped against the base part of the front derailleur.

4. The chain guide arrangement for guiding a drive chain according to claim 3, wherein the chain guide mounting element is a mounting screw, which is screwed into an inside mounting thread in the fastening screw head of the fastening screw in the retaining plate.

5. The chain guide arrangement for guiding a drive chain according to claim 1, wherein the chain guide mounting element is a mounting screw, which is screwed into an inside mounting thread in the fastening screw head of the fastening screw in the base part.

6. The chain guide arrangement for guiding a drive chain according to claim 1, wherein the chain guide mounting element is a mounting nut, which is screwed onto an outside mounting thread on the fastening screw head of the fastening screw.

7. The chain guide arrangement for guiding a drive chain according to claim 1, wherein the fastening screw head has a contact surface with a conical shape which is in contact with an inside circumferential surface in the mounting opening of the mounting section of the chain guide member.

8. The chain guide arrangement of claim 7, wherein the contact surface tapers toward one end.

9. A chain guide arrangement for guiding a drive chain on a set of front chainrings on a bicycle with a bicycle frame, the chain guide arrangement comprising:
   a front derailleur including:
      a base part, and
      a front derailleur mounting element for mounting the front derailleur to the bicycle frame, wherein the front derailleur mounting element is a fastening screw threadably received in the base part of the front derailleur to mount the front derailleur to the bicycle frame;
   a chain guide member mounted to the base part of the front derailleur, the chain guide member including:
      a mounting section,
      a guide section which is arranged with an offset from the mounting section, the guide section positionable to guide the drive chain,
      a connecting section between the mounting section and the guide section,
      a chain guide mounting element separate from the front derailleur mounting element, the chain guide mounting element mounted to the front derailleur mounting element to fasten the mounting section of the chain guide member to the base part of the front derailleur independently of the mounting of the front derailleur to the bicycle frame by the front derailleur mounting element, and
      an adjusting screw disposed in the mounting section of the chain guide member, the adjusting screw positioned along an axis (D) generally perpendicular to an axis (A) of the fastening screw, wherein the adjusting screw bears against a stop formed on a retaining plate to allow an adjustment of the chain guide member in an angular position about the axis (A).

10. The chain guide arrangement of claim 9, wherein the front derailleur mounting element is a clamp formed integral with the base part of the front derailleur, the base part having a mounting thread for mounting the chain guide member.

11. The chain guide arrangement of claim 9, wherein the retaining plate is configured to be clamped against the base part of the front derailleur.

12. The chain guide arrangement of claim 11, wherein the chain guide mounting element is a mounting screw threadably received in an interior mounting thread in a head of the fastening screw in the retaining plate.

13. The chain guide arrangement of claim 9, wherein the chain guide mounting element is a mounting screw threadably received in an interior mounting thread in a head of the fastening screw in the base part.

14. The chain guide arrangement of claim 9, wherein the chain guide mounting element is a mounting nut threadably received on an exterior mounting thread on a head of the fastening screw.

15. The chain guide arrangement of claim 9, wherein the mounting section has a mounting open with an interior circumferential surface and the fastening screw has a head including a contact surface with a conical shape contacting the interior circumferential surface of the mounting opening.

16. The chain guide arrangement of claim 15, wherein the contact surface tapers toward one end.

17. A chain guide arrangement for guiding a drive chain on a set of front chainrings on a bicycle with a bicycle frame, with a chain guide member which is designed for installation on a base part of a front derailleur mounted on the bicycle frame, the front derailleur including a front derailleur mounting element the chain guide member comprising:
   a mounting section including a mounting opening;
   a guide section which is arranged with an offset from the mounting section, the guide section being positionable adjacent the drive chain;
   a connecting section between the mounting section and the guide section;
   a chain guide mounting element configured to be mounted to the front derailleur mounting element to fasten the mounting section of the chain guide member to the base part of the front derailleur independently of the mounting of the front derailleur to the bicycle frame, wherein the front derailleur mounting element includes a fastening screw threadably connectable to the base part of the front derailleur to mount the front derailleur to the bicycle frame, and a fastening screw head of the fastening screw has a contact surface with a conical shape which is in contact with an inside circumferential surface in the mounting opening of the mounting section of the chain guide member.

* * * * *